(No Model.)
S. RITTY.
HORSE RAKE.
No. 346,947. Patented Aug. 10, 1886.
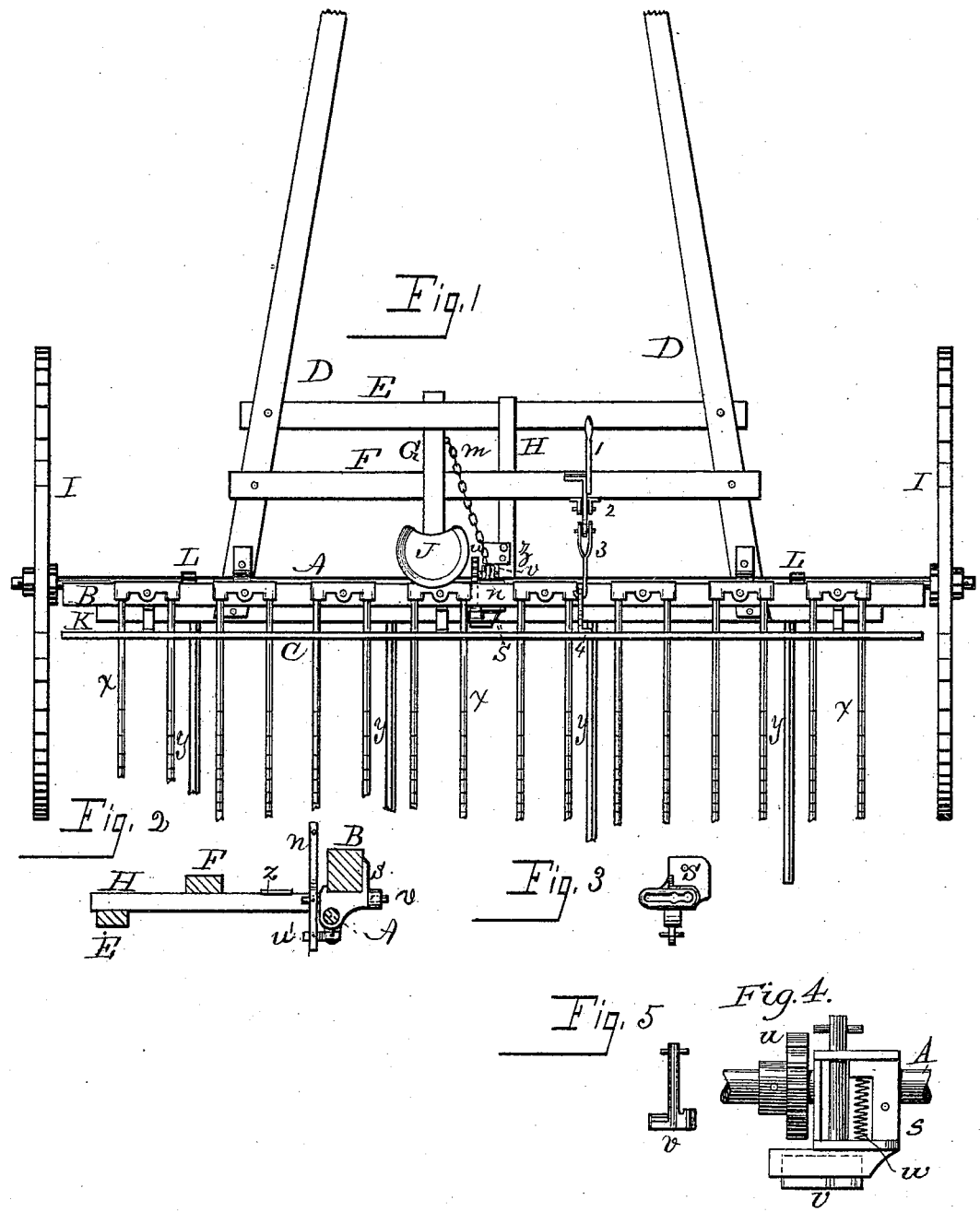
WITNESSES:
Leopold Leibold
J.B. McLardie
INVENTOR
Sebastian Ritty
BY B. Pickering
His ATTORNEY

UNITED STATES PATENT OFFICE.

SEBASTIAN RITTY, OF DAYTON, OHIO.

HORSE-RAKE.

SPECIFICATION forming part of Letters Patent No. 346,947, dated August 10, 1886.

Application filed November 27, 1885. Serial No. 184,130. (No model.)

*To all whom it may concern:*

Be it known that I, SEBASTIAN RITTY, a citizen of the United States, residing at Dayton, in the county of Montgomery and State of Ohio, have invented a certain new and useful Improvement in Horse-Rakes; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in horse-rakes; and it consists, solely, of an improvement in the discharging device, as will be fully hereinafter set forth.

The mechanism is illustrated in the drawings, in which Figure 1 is a top view of the horse-rake. Fig. 2 is a transverse section of the same to the left of the discharging device. Fig. 3 is a rear view of the housing. Fig. 4 is a top view of the discharging device as attached to the axle. Fig. 5 is a top view of the dog.

Similar letters designate like parts throughout the several views.

A is an iron axle mounted on the ground-wheels I I. To the axle is pivoted the rake-head D by the bearing-blocks L L and the housing S. To the rake-head are pivoted the usual form of steel teeth $x$, which play within mortises of the guide-board C. The shafts D D are connected by the cross-bars E and F. H is a bar attached to these cross-bars at a right angle, and on the rear end is attached the plate $z$, which serves to disengage the dog. The bar K is bolted to the under side of the shafts, and to this are attached the cleaner-sticks $y$. The bar G is supported on the cross-bars, and on the top of it is mounted the seat J. To the guide-bar is bolted the arm 4, which is connected to the lower end of the lever 1, which is adapted to be used by both the hand and foot, and which is pivoted to a bearing on the rear cross-bar. This device serves the double purpose of dumping the rake by hand and holding the teeth to the ground. To the axle is rigidly attached the ratchet-wheel $u$, which is caused to rotate by a forward movement of the wheels. The wheels are loose upon the spindles, and rotate the axle by means of pawls and ratchets, which leave the wheels free when they are moved backward. The housing S is bolted to the rake-head, and has an orifice which embraces the axle. The dog $v$, Fig. 5, occupies the orifice shown at Fig. 3. The right-hand projection of the dog bears against the spiral coil $w$, Fig. 4, when in position. The housing has a projection at its bottom, to which the lever $n$ is pivoted by an intermediate coupling-plate, $u'$, and this forked lever is jointed to the dog. This lever is connected by a chain, $m$, to a staple in the bar G, and this chain may be attached to a foot-lever instead. The spiral spring is placed within the housing. Then the dog is passed in bearing against said spring. The operating-lever is then secured to said dog by means of a pin. The operation of the spring is to hold the dog out of contact with the ratchet-wheel, and the backward movement of the said dog is arrested by said lever coming in contact with the face of the housing.

The manner of discharging the load is thus: The foot is pressed on chain $m$. This carries the dog forward to engage the ratchet-wheel on the axle. This causes the teeth to rise until the lever $n$ comes in contact with the plate $z$, attached to the bar H, when the dog is disengaged and the teeth fall back to the ground freed from their load.

I do not claim a dog supported in a housing to engage a ratchet-wheel fixedly attached to the axle of a horse-rake. My invention consists of the lever pivoted to the housing and coupled to the clutch to operate the same, and the separate orifice for the spiral spring in the housing, to hold the clutch out of contact with the ratchet-wheel. The end of the operating-lever may be bent, so that the same may be pivoted to the projection of the housing. Then, to accommodate the movement, the pin in the clutch would require a slot in the lever.

Having fully described my invention, what I claim, and desire to secure by Letters Patent, is—

1. In a horse-rake, the combination of the ratchet-wheel attached to the axle carried by the ground-wheels, the housing S, rake-head B, dog $v$, with lateral extensions having bearings in said housing, spiral spring $w$, lever $n$, link $u'$, and detaching-plate $z$ on the thills, substantially as set forth.

2. In a horse-rake, the dog $v$, with lateral projections, one covering the face of the ratchet-wheel, the other the space in housing for the spiral spring, and the housing S, with lateral projection forming a bearing for said dog, in combination with said spiral spring, axle, ratchet-wheel, and rake-head, substantially as set forth.

In testimony that I claim the foregoing as my own I affix my signature in presence of two witnesses.

SEBASTIAN RITTY.

Witnesses:
B. PICKERING,
EDWARD T. HALL.